No. 758,548. PATENTED APR. 26, 1904.
G. A. MEDLIN.
CLUTCH PULLEY.
APPLICATION FILED APR. 24, 1903.
NO MODEL.
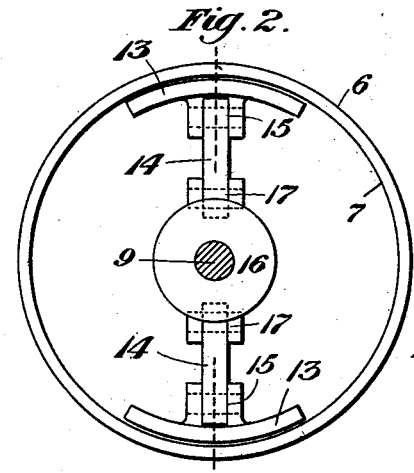
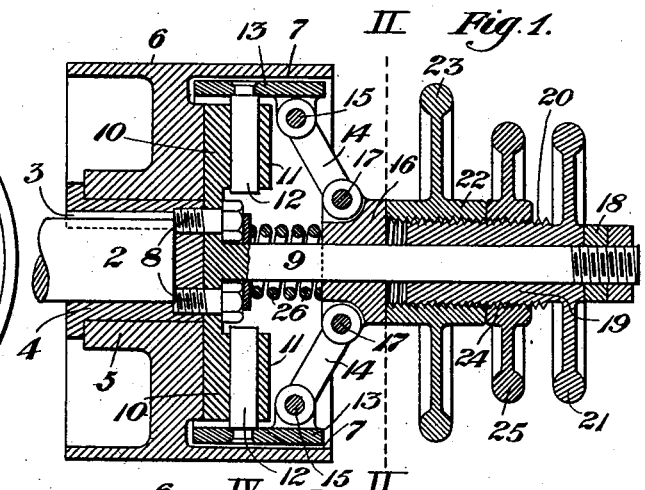
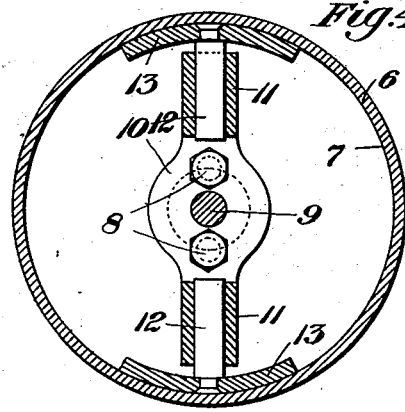
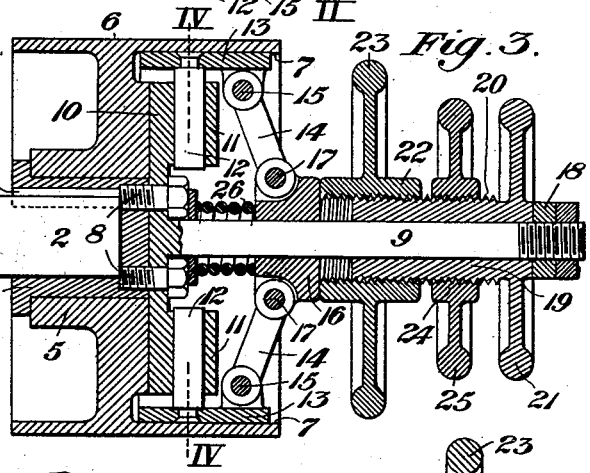
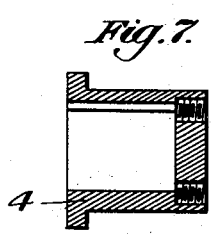
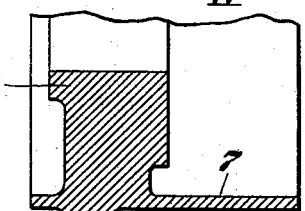
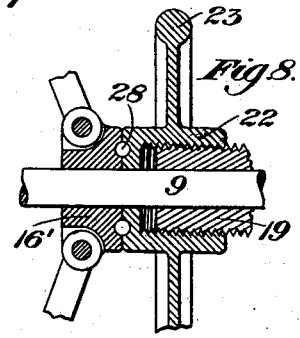
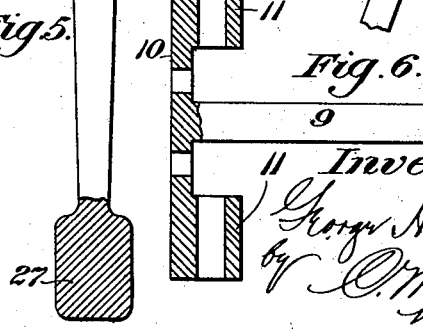
Witnesses:
Inventor:
George A. Medlin
by O. M. Clarke
his Attorney No. 758,548. Patented April 26, 1904.

UNITED STATES PATENT OFFICE.

GEORGE A. MEDLIN, OF EVERGREEN, PENNSYLVANIA.

CLUTCH-PULLEY.

SPECIFICATION forming part of Letters Patent No. 758,548, dated April 26, 1904.

Application filed April 24, 1903. Serial No. 154,114. (No model.)

*To all whom it may concern:*

Be it known that I, GEORGE A. MEDLIN, a citizen of the United States, residing at Evergreen, in the county of Allegheny and State of Pennsylvania, have invented certain new and useful Improvements in Clutch-Pulleys, of which the following is a specification, reference being had therein to the accompanying drawings, forming part of this specification, in which—

Figure 1 is a vertical longitudinal sectional view through my improved friction-clutch pulley, taken on the line I I of Fig. 2, showing the clutch out of engagement. Fig. 2 is a cross-sectional view indicated by the line II II of Fig. 1. Fig. 3 is a sectional view similar to Fig. 1, but showing the clutch in engagement. Fig. 4 is a cross-sectional view indicated by the line IV IV of Fig. 3. Fig. 5 is a partial detail sectional view of a pulley provided with a fly-wheel detached from the other portions of the mechanism. Fig. 6 is a detail view, detached, of the stem or guide-shaft for the adjusting-wheels. Fig. 7 is a sectional detail view of the shaft-bushing detached. Fig. 8 is a detail view of the adjusting mechanism, showing ball-bearings.

My invention refers to improvements in friction-clutches, and more particularly to that class of clutches wherein contact is made with the interior surface of a pulley or other similar element, so as to lock it in operative engagement with a carrying-shaft upon which it is journaled.

The objects in view are to provide a simple and efficient device capable of rapid and accurate adjustment provided with means whereby the friction-clutches are adjusted, controlled, and guided and to the various other details of construction which will be more fully hereinafter set forth.

Referring now to the drawings, 2 is the shaft of an engine or of other suitable mechanism to or from which it is desired to transmit motion, it being understood that the invention is equally well adapted for the purpose of transmitting motion or power from the shaft through the pulley to any other operative mechanism by means of belts or their equivalent or from any outside source of power through such connecting mechanism and the surrounding pulley to the shaft 2. Secured to the end of the shaft by key 3 or other equivalent device is a surrounding bushing 4, upon which is journaled the hub 5 of a pulley 6 of any suitable construction, but preferably provided at one end with a finished interior clutch-surface 7, with which the friction-shoes will make binding contact. Secured to the end of the bushing by means of bolts 8 or other suitable means is an end plate 10, having extending therefrom and integrally formed therewith a guide-shaft 9 and guides 11 for the pins 12 of the friction-shoes 13. These friction-shoes, as shown in Figs. 2 and 4, are curved on their outer faces corresponding to the interior face 7 of the pulley and have a limited range of movement upon their guiding-pins 12 within the bearings 11, as stated. The friction-shoes are forced outwardly by means of toggle-jointed links 14 14, connected with the shoes by knuckle-joints 15 and with a controlling-ring 16, mounted on shaft 9, by similar knuckle-joints 17. As thus constructed it will be seen that if the ring 16 is forced inwardly toward the pulley with sufficient power the shoes 3 will make gripping contact with the pulley and transmit motion, through pins 12, frame 10, and bushing 4, to the shaft or, vice versa, from the shaft to the pulley.

On the outer end of the stem or shaft 9 is a terminal abutment 18, consisting of a nut with a reinforcing lock-nut, a cotter-pin, or other suitable means by which a backing will be provided around the stem 9 to counteract outward pressure. Rotatably mounted upon the shaft 9 and bearing against said abutment is an elongated bushing 19, provided with an outer threaded periphery 20 and a hand-wheel 21. Screwed on the inner end of said bushing 19 is an outer adjusting-nut 22, adapted to bear against ring 13 and provided with a hand-wheel 23. A similar locking-nut 24, having a hand-wheel 25, is also screwed upon bushing 19, so as to be locked up against the back of the hub 22 to hold it immovable with relation to the bushing 19.

For the purpose of releasing the shoes from contact when nut 22 is reversed a spring 26 is interposed between the ring 16 and the inner head of stem 9 in any suitable manner, so as to exert pressure outwardly, thereby withdrawing the shoes from contact.

As shown in Fig. 5, the pulley 6 is provided with a fly-wheel extension 27, and it will be understood that the shape or design of the power-transmitting element 6 may be varied, as by providing it with gear-teeth to suit varying conditions of use, provided the interior face 7 for the shoes is present.

In Fig. 8 I have shown a row of bearing-balls 28, interposed between the ring 16' and the adjusting-nut 22, thereby reducing friction and permitting the ring to rotate independent of the adjusting-nut while being turned by hand. While such ball-bearings may be inserted between these elements and others of the invention which are at times relatively stationary and moving and will contribute to ease of operation, they are not absolutely necessary and may be dispensed with, as in the principal figures of the drawings, without affecting its operation.

The adjustment may be made by holding bushing 19 stationary with one hand and adjusting the nut 22 by the other, or vice versa, the locking-nut 24 being adjusted in the same manner. After having been adjusted the various wheels will be carried around the stem 9 by frictional engagement imparted from ring 16, while being easily arrested by hand and held stationary during the tightening or loosening operation.

The arrangement of the parts and the shoes and their mounting is very compact, and the transmission of power through frame 10, bushing 4, and shaft 2 with the bearing function of the bushing contributes largely to the efficiency of operation. The device is of especial advantage with oil-well and other engines. It is very sensitive and easily operated and will be found to give very satisfactory results in use.

Having described my invention, what I claim, and desire to secure by Letters Patent, is—

In a friction-clutch, in combination, a driving-shaft, a bushing secured thereto, a guide-shaft having an integrally-formed end plate said end plate being secured to the bushing, guide-bearings for the friction-shoes extending laterally from the end plate and integral therewith, clutch-shoes slidingly mounted in said guide-bearings, a pulley loosely mounted on said bushing and provided with a clutch-face adapted to be engaged by said shoes, a ring slidingly mounted on the guide-shaft, toggle-levers jointed to the clutch-shoes and to said ring, a threaded bushing loosely journaled on the guide-shaft and provided with a hand-wheel, an adjusting-nut also provided with a hand-wheel screwed on said bushing and adapted to bear against and move said ring to operate the clutch, and a locking-nut provided with a hand-wheel also screwed on said bushing and adapted to bear against and prevent longitudinal motion of the adjusting-nut; substantially as described.

In testimony whereof I affix my signature in presence of two witnesses.

GEORGE A. MEDLIN.

Witnesses:
C. M. CLARKE,
JAS. J. MCAFEE.